United States Patent [19]

Puppolo

[11] Patent Number: 4,509,100

[45] Date of Patent: Apr. 2, 1985

[54] LOW INDUCTANCE WOUND CAPACITOR

[75] Inventor: Henry F. Puppolo, North Adams, Mass.

[73] Assignee: Sprague Electric Company, North Adams, Mass.

[21] Appl. No.: 455,348

[22] Filed: Jan. 3, 1983

[51] Int. Cl.³ .......................... H01G 9/00; H01G 1/14
[52] U.S. Cl. ..................................... 361/433; 29/570; 361/306
[58] Field of Search .................. 361/306, 433; 29/570, 29/25.42

[56] References Cited

U.S. PATENT DOCUMENTS

| | | | |
|---|---|---|---|
| 3,346,781 | 10/1967 | Moresi et al. | 317/230 |
| 3,654,524 | 4/1972 | Puppolo et al. | 317/230 |
| 3,792,323 | 2/1974 | Stockman | 317/260 |
| 3,842,325 | 10/1974 | Callins et al. | 317/230 |
| 3,854,196 | 12/1974 | Derrick et al. | 29/570 |
| 4,447,852 | 5/1984 | Clement | 361/306 |

Primary Examiner—John Gonzales
Assistant Examiner—Douglas S. Lee

[57] ABSTRACT

An aluminum electrolytic capacitor has a wound extended-foil section with the edges of one of the foils extending from one edge of the roll and the edges of the other from the other edge. These extended foils are deformed after the section is wound in such a way that they are stretched and a metallurgical bond is formed between adjacent edges. A low-inductance, low electrical series resistance (ESR) capacitor is obtained as a result. The deformation may be accomplished by frictional cutting using a diamond saw.

15 Claims, 8 Drawing Figures

LOW INDUCTANCE WOUND CAPACITOR

BACKGROUND OF THE INVENTION

This invention pertains to a wound, aluminum electrolytic capacitor which has an extended-foil capacitor section in which the extended foils are deformed, stretched, bonded preferably by sawing, to provide a low inductance, low ESR unit.

In the past, low inductance units have been obtained by flattening wound, extended foil sections and welding the extended foil sections to striplines or terminal pieces or even edge-welding the foils in spaced positions along the extended foil edges.

Still other units have featured the fusion of extended cathode foils along selected paths to reduce their inductive effects. Alternately, low inductance units may have multiple electrode tabs to reduce inductance or particular terminal connections. Both the multiple tabbing or the insertion of terminal members require that the winding of the capacitor section be interrupted for the insertion of the tabs or terminals. Production of the welded units has required an expensive tungsten inert gas (TIG) welding step or a multiple welding step.

SUMMARY OF THE INVENTION

It is a feature of this invention to produce a low-inductance, low-electrical series resistance (ESR) unit that does not require insertion of multiple tabs during rolling, nor a TIG single or multiple welding step. This feature is realized by rolling the unit in extended foil fashion and deforming, preferably by sawing, the extended foil edges which stretches and "smears" the edges forming metallurgical bonds. Tabs are attached to the foils near their ends, and after impregnation of the unit, connected to terminals of the final unit. Thus, a round, rolled, low-inductance, low ESR unit is provided without requiring the insertion of multiple tabs during rolling by a simple deforming operation. Preferably, a diamond saw is used for the deforming step.

If a flat unit is required, the wound section is flattened, tabs are connected at or near to the foil ends, and the edges are deformed, preferably by cutting with a diamond saw.

DESCRIPTION OF THE PREFERRED EMBODIMENTS

Figure 1:
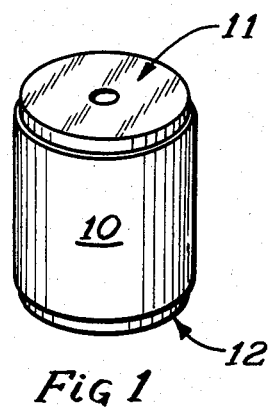
FIG. 1 is a perspective view of a rolled, extended-foil section having the edges of the extended foils deformed ("smeared").
Figure 2A:
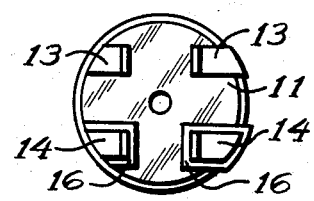
FIGS. 2a and 2b are top and bottom views, respectively, of a four-lead capacitor section with the leads arranged in a radial fashion.
Figure 2B:
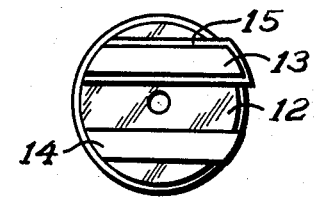
Figure 3A:
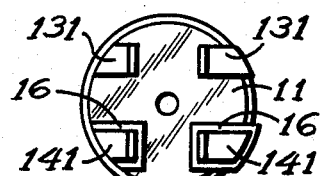
FIGS. 3a and 3b are top and bottom views, respectively, of a four-lead capacitor section with the leads arranged in an axial fashion.
Figure 3B:
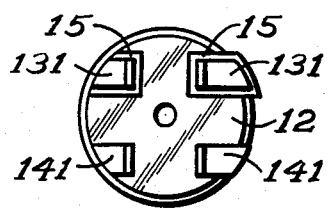

Capacitor section 10, as shown in FIG. 1, consists of an anode foil and a cathode foil wound with interleaved spacer material with the anode foil extending beyond the spacer and cathode foil at one edge of the section and the cathode foil extending beyond the anode foil and spacer at the opposite edge of the section.

Extended anode foil edges 11 and cathode foil edges 12 are subjected to a cutting and plastic deformation step in which the edges 11, 12 are folded over and elongated so that they are "smeared". Plastic deformation is involved as the smeared edges do not return to their original state. A metallurgical bond is formed between adjacent edges giving the low inductance by shorting out the foil windings but there is still open space between the foils so that section 10 can be impregnated with electrolyte.

Since this smearing of edges 11, 12 is preferably accomplished by sawing the extended foils with a diamond saw, the metallurgical bonds formed may be small friction welds. Any cutting tool that will produce such bonded edges may be used in place of a diamond saw, e.g., a guillotine, friction saw, tungsten carbide saw, etc.

Electrode tabs are attached as shown in the FIGS. 2-5. In FIGS. 2a and 2b, the top and bottom views, respectively, of section 10, tab 13 is an elongated metal strip with both ends bent forming substantially perpendicular tabs for attachment to terminal means (not shown). One portion of tab 13 is electrically connected, preferably by stitching or welding, to the end or near the end of anode foil. The elongated strip passes along the length of one side of section 10 across the opposite end of section 10 where it is insulated from the deformed cathode foil edges 12 by insulating member 15 and up the other side of section 10. The second end of tab 13 is bent similarly to the first end, and this end also lies against deformed anode foil edges 11.

Tab 14 is attached to the cathode foil and is similarly bent except that insulating members 16 are provided between its bent ends and deformed anode foil edges 11 and lies against deformed cathode foil edges 12 at the opposite end of the capacitor.

In FIGS. 3a and 3b, again top and bottom views, respectively, the tabs are arranged to provide axial leads. The continuous tabs 13 and 14 referred to in FIG. 2 become two piece tabs 131 and 141. One end of each tab 131 lies against deformed anode foil edges 11 and each of the other ends of tab 131 are insulated from deformed cathode foil edges 12 by insulating member 15 which may be in one piece or two pieces as shown. Similarly, the ends of cathode tabs 141 are insulated from deformed anode foil edges 11 by insulating member 16 which may be in one piece or two pieces as shown. The other end of each cathode tab 141 lies against the deformed cathode foil edges 12. The portions of tabs 131 and 141 intermediate the ends are attached to the anode and cathode foils along the length of the opposite sides of section 10.

Figure 4:
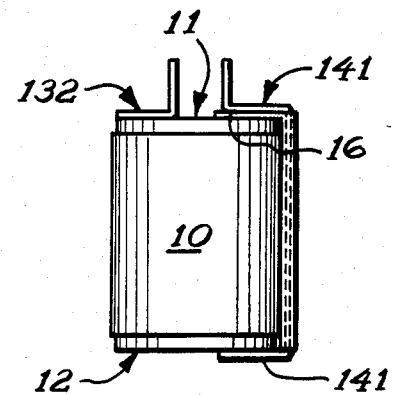
FIG. 4 is a side-view of a two-lead capacitor section with the leads arranged in a radial fashion.

In FIG. 4, tab 132 and tab 141 are arranged for a radial lead capacitor with two leads. Tab 132 is attached to the anode foil and bent over against deformed anode edges 11. Tab 141 is similarly attached to the cathode foil and bent over deformed cathode foil edges 12; it extends along the side of section 10 and terminates in a second bent end 141 insulated from deformed anode foil edges 11 by insulating member 16.

Figure 5:
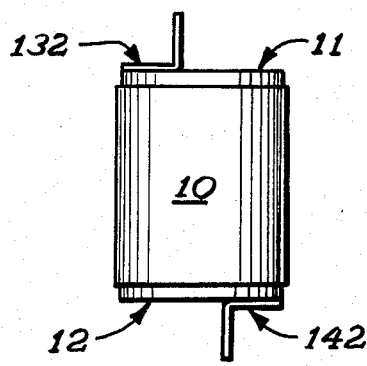
FIG. 5 is a side-view of a two-lead capacitor section with the leads arranged in an axial fashion.

In FIG. 5, tab 132 is attached to the anode foil and bent over deformed anode edges 11 while tab 142 is attached to cathode foil and bent over deformed cathode edges 12 to provide an axial, two lead capacitor.

Figure 6:
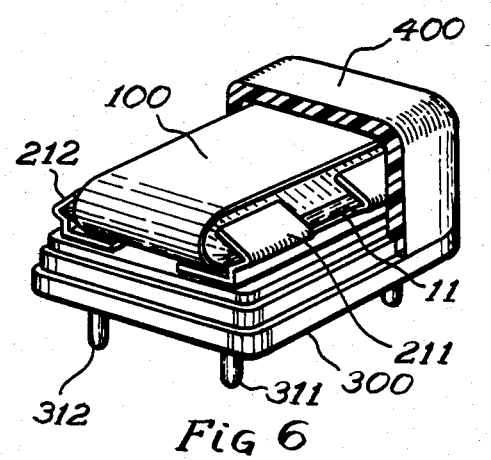
FIG. 6 is a perspective view of a flat capacitor section connected to bus clamp terminals.

In FIG. 6, capacitor section 100 has been wound with interleaved spacers and flattened. The extended edges of the foils are cut with a diamond saw producing deformed anode foil edges 11 and deformed cathode foil edges 12. Tabs (not shown) are attached to the anode and cathode foils respectively and are electrically connected to bus clamps 211, 212 respectively, which are then folded over and clamped to hold section 100 in place. Clamps 211 and 212 are connected to leads 311 and 312 respectively, which extend through an insulating base 300. Section 100 is impregnated with electrolyte (not shown) and case top 400 is sealed to base 300. Details of the construction of the flat unit are described by Warren J. Clement in copending application Ser. No. 387,739, filed June 14, 1982.

All of the sections depicted in FIGS. 2 through 6 are impregnated with electrolyte and placed in containers. The tabs are connected to appropriate terminals, and the units are closed, sealed and aged.

The following example shows the usefulness of the present invention. In it, the sections were chilled in liquid nitrogen at $-130°$ C. and the edges deformed, or the deformation was carried out at room temperature, 25° C. In either case, a diamond saw was used to produce the deformation.

EXAMPLE 1

Aluminum foil sections were rolled interleaved spacer material and 0.125 inch extended foil edges. One lot of fifteen sections were soaked in liquid nitrogen for at least fifteen minutes to stiffen the sections, and the foil edges were deformed using a diamond saw ($-130°$ C. cut). A second lot of fifteen units were edge-deformed at room temperature (25° C. cut). The anode and cathode tabs were stitched to the appropriate foil edges to provide the axial capacitor of FIG. 6 and the sections were impregnated with electrolyte. The cathode tab and a lead were welded to an aluminum can and the anode tab to an aluminum insert in the cover. All units were sealed and aged at 85° C. with 12 VDC applied. The results of 4000 hours life test are reported below giving average values for capacitance and ESR and median values for DC leakage current (DCL). The units are rated as 2200 $\mu$F/7.5 VDC.

TABLE 1

| Hours | 25° C. Cut | | | $-130°$ C. Cut | | |
|---|---|---|---|---|---|---|
| | Cap ($\mu$F) | ESR($\Omega$) | DCL ($\mu$A) | Cap($\mu$F) | ESR($\Omega$) | DCL ($\mu$A) |
| 0 | 2616.9 | 0.072 | 0.008 | 2610.8 | 0.074 | 0.0085 |
| 4000 | 2490.6 | 0.086 | 0.0036 | 2426.9 | 0.094 | 0.0031 |

EXAMPLE 2

This example compares conventional capacitors with those of the present invention. Two of the capacitors are a low voltage and a high voltage version of the filter capacitor described in the above-noted Clement copending application. The corresponding ones with the deformed edges of the present invention are made by rolling an extended foil section, flattening it, and deforming the edges with a diamond saw. These edges are then electrically connected via stitched electrode tabs to the bus strip described in the above-noted Clement application. The multi-tabbed unit is a conventional wound unit with multiple tabs inserted into the roll during winding. Ratings for each unit and average ESR values are given for each unit. Diamond saw indicates units made by the present invention.

TABLE 2

| Rating | Type | ESR, $\Omega$ |
|---|---|---|
| 350,000 $\mu$F/6.3 VDC | Multi-tab round | 0.0036 |
| | Diamond saw round | 0.004–0.005 |
| 5400 $\mu$F/6.3 VDC | Flat filter | 0.0248 |
| | Diamond saw flat | 0.0199 |
| 670 $\mu$F/60 VDC | Flat filter | 0.105 |
| | Diamond saw flat | 0.103 |
| 2200 $\mu$F/7.5 VDC | Diamond saw round | 0.72 |

The ESR values are at least as good as the conventional units, and the units of the present invention have the advantages of eliminating multi-tabbing during winding and eliminating costly TIG welding in the flat filters. In addition, ESR can be lowered by using wider or heavier tabs with the round sections of the present invention as the tabs are attached to the foil ends at the outside of the roll and therefore do not interfere with nor interrupt winding.

Thus, the capacitors of the present invention provide a unit that is more economical to manufacture without sacrificing electrical quality.

What is claimed is:

1. An aluminum electrolytic capacitor comprising two electrode foils with interleaved spacer material convolutely wound into an extended-foil section, said section being impregnated with an electrolyte, the extended edges of said foils each being deformed in such a manner that said edges at the ends of said section are folded and subjected to a plastic deformation such that said edges are smeared and there is a metallurgical bond between adjacent of said foils to provide a low inductance capacitor section with low electrical series resistance absent any conductive coating of said edges.

2. A capacitor according to claim 1 wherein said section is a rolled and flattened extended-foil section.

3. A capacitor according to claim 2 wherein an electrode tab is electrically connected to one of said foils adjacent the outer end thereof and a second electrode tab is electrically connected to the other of said foils adjacent the outer end thereof.

4. A capacitor according to claim 3 wherein said tab is electrically connected by welding.

5. A capacitor according to claim 3 wherein said tab is electrically connected by stitching.

6. A capacitor according to claim 3 wherein said tab is an elongated strip which is electrically connected to one of said foils and electrically insulated from said deformed edges of the other of said foils.

7. A capacitor according to claim 6 wherein said second tab is elongated strip also and is electrically insulated from said deformed edges of said one foil.

8. A process for making an aluminum electrolytic capacitor comprising winding an aluminum anode foil and an aluminum cathode foil with interleaved spacers in extended-foil fashion so that the edges of said anode foil extend beyond said spacers and beyond said cathode foil at one edge of the wound roll and the edges of said spacers and beyond said anode foil at an opposite edge of said roll, deforming said extended anode foil edges and said extended foil cathode edges so that said edges are folded over and plastically deformed smearing said edges and providing a metallurgical bond between adjacent edges.

9. A process according to claim 8 wherein said deforming is produced by a frictional cutting operation in which said foil edges are dragged in the direction of the cut and raptured.

10. A process according to claim 9 wherein said cutting is performed by a guillotine.

11. A process according to claim 9 wherein said cutting is performed by sawing said foil edges.

12. A process according to claim 11 wherein said sawing is performed by a diamond saw.

13. A process according to claim 8 wherein said capacitor is immersed in liquid nitrogen prior to said deforming to stiffen said section to aid in said deforming.

14. A process according to claim 8 wherein after said deforming, an electrode tab is electrically connected to said anode foil, an electrode tab is electrically connected to said cathode foil, and said section is impregnated with electrolyte.

15. A process according to claim 8 wherein said roll is flattened prior to said deforming.

* * * * *